(12) United States Patent
Smith et al.

(10) Patent No.: US 7,047,438 B2
(45) Date of Patent: May 16, 2006

(54) ACCOMMODATION OF MEDIA DEFECT GROWTH ON A DATA STORAGE MEDIUM THROUGH DYNAMIC REMAPPING

(75) Inventors: David Livingston Smith, Rochester, MN (US); Donald Earl Vosberg, Rochester, MN (US); Douglas Michael Zuercher, Byron, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 547 days.

(21) Appl. No.: 10/300,972

(22) Filed: Nov. 21, 2002

(65) Prior Publication Data

US 2004/0100715 A1   May 27, 2004

(51) Int. Cl.
*G06F 11/00* (2006.01)

(52) U.S. Cl. ............. 714/8; 369/53.17; 369/53.15; 369/47.14

(58) Field of Classification Search .............. 714/8; 369/53.15, 53.17, 47.14
See application file for complete search history.

(56) References Cited

U.S. PATENT DOCUMENTS

| | | | |
|---|---|---|---|
| 5,166,936 A | | 11/1992 | Ewert et al. ............ 371/21.6 |
| 5,418,767 A | * | 5/1995 | Gaudet et al. .......... 369/53.16 |
| 5,822,142 A | * | 10/1998 | Hicken .................. 360/53 |
| 5,862,314 A | * | 1/1999 | Jeddeloh ................ 714/8 |
| 5,917,724 A | * | 6/1999 | Brousseau et al. ......... 700/81 |
| 5,937,435 A | * | 8/1999 | Dobbek et al. ........... 711/202 |
| 6,034,831 A | | 3/2000 | Dobbek et al. |
| 6,119,201 A | * | 9/2000 | Kulakowski et al. ....... 711/112 |
| 6,205,099 B1 | * | 3/2001 | Sasaki et al. ........... 369/53.17 |
| 6,212,647 B1 | * | 4/2001 | Sims et al. .............. 714/8 |
| 6,279,136 B1 | * | 8/2001 | Kulakowski et al. ....... 714/769 |
| 6,728,899 B1 | * | 4/2004 | Ng et al. ................ 714/8 |
| 6,771,440 B1 | * | 8/2004 | Smith .................... 360/31 |
| 6,782,458 B1 | * | 8/2004 | Noble ................... 711/163 |

(Continued)

FOREIGN PATENT DOCUMENTS

WO    WO 01/31651 A1    3/2001

OTHER PUBLICATIONS

Andoh, Haruo et al., *Method for Registering a Defect Map Within a Hard Disk Drive*, U.S. Appl. No. 10/075,928 filed Feb. 14, 2002 and published as Publication No. US-2002/0122266-A1 on Sep. 5, 2002.

(Continued)

*Primary Examiner*—Robert Beausoliel
*Assistant Examiner*—Christopher McCarthy
(74) *Attorney, Agent, or Firm*—Wood, Herron&Evans, L.L.P.

(57) ABSTRACT

An apparatus, program product and method of mapping defects on a data storage medium analyze one or more previously-identified defects on a storage medium to detect any growth in those defects over time, such that any detected growth of a previously-identified defect can be accommodated for through the dynamic remapping of additional surface area adjacent the defect to one or more replacement regions located elsewhere on the storage medium. As such, any buffer regions defined around pre-existing defects are effectively maintained as those defects grow over time, thus maintaining suitable protection from data loss that would otherwise result from an attempt to store information in a region that has been impinged upon as a result of the growth of an adjacent defect.

29 Claims, 5 Drawing Sheets

U.S. PATENT DOCUMENTS

| | | | |
|---|---|---|---|
| 2001/0044873 A1* | 11/2001 | Wilson et al. | 711/4 |
| 2002/0124132 A1* | 9/2002 | Haines et al. | 711/112 |
| 2002/0191319 A1* | 12/2002 | Liew et al. | 360/53 |
| 2003/0112538 A1* | 6/2003 | Smith | 360/31 |

OTHER PUBLICATIONS

*Australian Patent Office Search Report and Examination Report, for SG 200306564-6*, mailed Aug. 5, 2005.

* cited by examiner

ACCOMMODATION OF MEDIA DEFECT GROWTH ON A DATA STORAGE MEDIUM THROUGH DYNAMIC REMAPPING

FIELD OF THE INVENTION

The present invention relates to data storage devices such as hard disk drives, optical drives, and the like. More particularly, it relates to detecting, correcting and reporting defects in the same.

BACKGROUND OF THE INVENTION

Data storage devices such as hard disk drives, tape drives, and the like typically utilize magnetic storage media from which data is read and/or to which data is written. A magnetic storage medium typically includes a layer of magnetizable material that is capable of being selectively magnetized to produce magnetic transitions that represent the stored information. Technology improvements continually reduce the area on a storage medium required to represent individual bits of information, and thus permit greater amounts of information to be stored on the storage medium. A hard disk drive, for example, may be constructed using one or more magnetic disks, with each disk being segmented into a number of concentric tracks, and with each track being segmented into polar arrays of sectors. Increases in storage density have decreased both the track pitch and the sector size for the magnetic disks utilized in modern hard disks drives, resulting in increasingly greater storage capacities.

As storage densities have increased, however, the sensitivity of data storage devices to media defects have also increased. In particular, for magnetic disks and other magnetic storage media, imperfections in the magnetic layers thereof can render certain areas of a storage medium unacceptable for use in storing information. Such media defects can range in size from very small, e.g., affecting only a few sectors occupying a few tracks, to relatively large, e.g., affecting many sectors occupying a large number of tracks. Furthermore, as storage densities increase, a media defect of a given size will tend to adversely affect a proportionately larger numbers of sectors and tracks.

Despite adherence to proper manufacturing techniques, at least some media defects occur in practically every manufactured disk. Conventionally, these media defects are accounted for in the electronics of the disk drive by effectively removing "defective" sectors from the storage areas recognized as being usable by the drive. In many disk drive designs, Surface Analysis Testing (SAT) is performed during manufacture of a disk drive, e.g., in connection with the initial low-level formatting of the disk drive. During SAT, defective sectors on a disk are identified, and then stored in a table and remapped to usable substitute, or "spare", sectors disposed in non-defective areas of the disk. Subsequently, whenever a drive attempts to access a defective sector, the spare sector to which it has been mapped can be accessed in its place.

Similarly, during the normal operation of some disk drive designs, additional defects may be detected, e.g., due to the detection of soft errors during unsuccessful read operations. In such instances, a process similar to the remapping that occurs during SAT may be used to remove newly-detected defects from the storage areas recognized as being usable by the drive.

It has been found, however, that due to various factors such as thermal and mechanical stresses and other media damaging mechanisms, some media defects have a tendency to increase in size over time. As such, media defects can sometimes affect sectors that are adjacent to previously-identified defective sectors, but that were originally identified as being non-defective during SAT. A result of the growth of a media defect into an area occupied by a sector identified as being non-defective can be the loss of information stored in the sector.

Conventionally, to accommodate for media defect growth, various sectors located adjacent identified defective sectors, which are commonly referred to as "pad" sectors, may be marked as unusable during SAT and/or during later operational remapping of new defects, thus effectively creating a buffer around each media defect. From the standpoint of a drive's electronics, pad sectors are treated the same as defective sectors, and as such, the buffer areas circumscribing each media defect are excluded from being used to store information.

The use of pad sectors, while providing the ability to accommodate for media defect growth, creates an undesirable tradeoff between storage capacity and reliability. Increasing the area of the buffers around each media defect increases reliability as a comparatively greater amount of media defect growth can be accommodated for, but at the expense of decreasing the amount of usable area on a disk. Likewise, selection of a minimal amount of pad sectors around each media defect maximizes storage capacity, but renders the disk drive more susceptible to data loss as a result of media defects expanding beyond their assigned buffer areas.

Therefore, a significant need has arisen in the art for an improved manner of handling the growth of media defects on magnetic disks and other forms of data storage media, and in particular, for an improved manner that more appropriately balances storage capacity and reliability.

SUMMARY OF THE INVENTION

The invention addresses these and other problems associated with the prior art by providing an apparatus, program product and method of mapping defects on a data storage medium in which one or more previously-identified defects on the storage medium are analyzed to detect any growth in those defects over time, such that any detected growth of a previously-identified defect can be accommodated for through the dynamic remapping of additional surface area adjacent the defect to one or more replacement regions located elsewhere on the storage medium. As such, any buffer regions defined around pre-existing defects are effectively maintained as those defects grow over time, thus maintaining suitable protection from data loss that would otherwise result from an attempt to store information in a region that has been compromised as a result of the growth of an adjacent defect.

For example, in one embodiment consistent with the invention, a defect map utilized by a hard disk drive may be accessed subsequent to the initiation of operational user of the disk drive to identify one or more pad sectors that have been remapped to spare sectors in connection with the identification of a media defect on a magnetic disk. Such pad sectors may then be scanned to detect whether they have since become defective themselves, thus indicating that the media defect has in fact grown over time. For any such detected defective pad sectors, the defect map may be updated to identify those pad sectors as defective, and to remap one or more additional sectors disposed adjacent to those pad sectors to create additional pad sectors in the defect map.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there are described exemplary embodiments of the invention.

DETAILED DESCRIPTION

Figure 1:
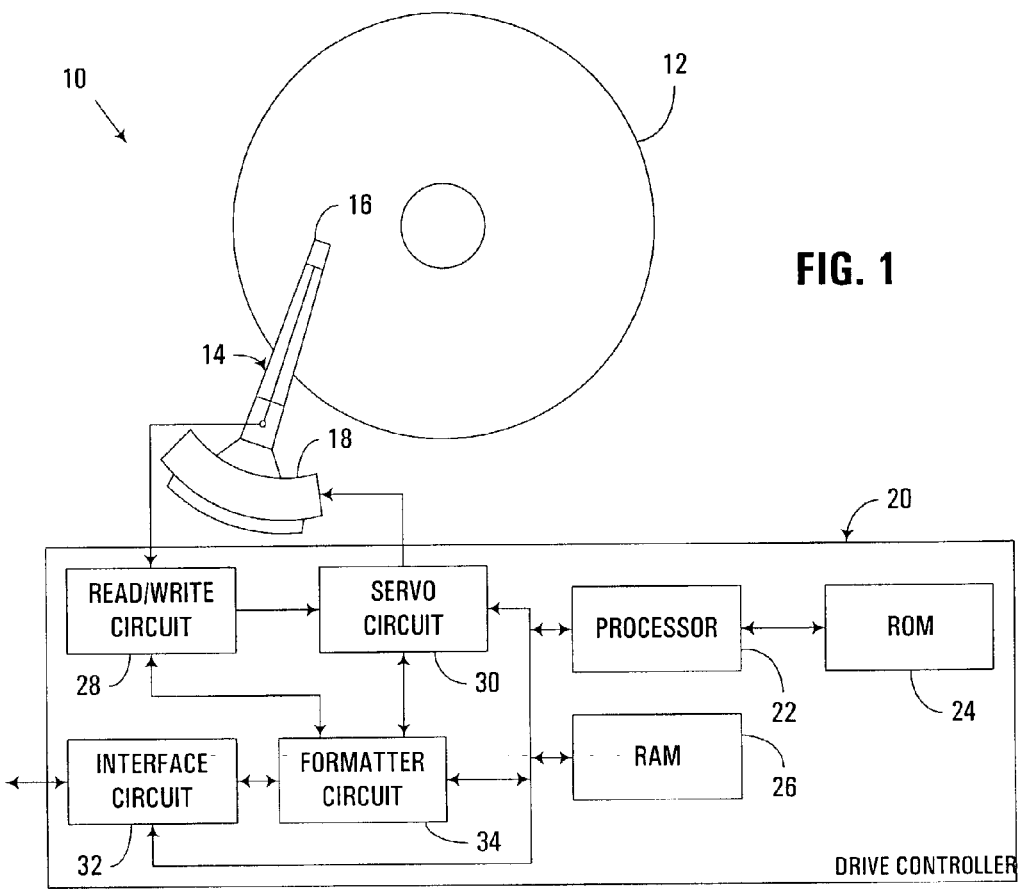
FIG. 1 is a block diagram of a data storage device incorporating dynamic remapping consistent with the invention.

The embodiments discussed hereinafter implement dynamic remapping to accommodate for media defects that "grow" beyond the original buffers established for such defects, e.g., due to thermal or mechanical stress, or other media damaging mechanisms to which a data storage medium may be subjected during operational use of a data storage device.

In a number of embodiments consistent with the invention, an idle time dynamic remapping feature may be provided to periodically review existing defects and verify that the buffer regions established around those defects (typically implemented using pad sectors) have not been compromised. For example, during idle time, an embodiment consistent with the invention may scan identified pad sectors to identify any such sectors that are no longer readable. Generally, unrecoverable data in a pad sector would infer that an adjacent media defect has grown, so to prevent any further growth of the defect that might otherwise compromise usable sectors and result in lost data, such an embodiment may perform additional reassigns in order to construct a larger buffer or pad area around an expanded defect.

In various embodiments, defects may be originally detected during SAT, or may be detected later, e.g., after operational use of a data storage device has been initiated. Regardless of the origin of such defects, however, a similar dynamic remapping process may be utilized to address any growth of these defects.

Embodiments consistent with the invention typically perform dynamic remapping by attempting to detect growth of a previously-identified defect on a data storage medium, and then, in response to detecting such growth, remapping one or more regions adjacent to a region associated the defect, referred to herein as a "defect region." Typically such remapping occurs through the remapping of the adjacent regions to one or more replacement regions, where the replacement regions are typically in addition to other replacement regions to which a defect region will have typically been remapped to prior to the herein-described dynamic remapping process.

In one exemplary embodiment discussed hereinafter, for example, a data storage device such as a hard disk drive may incorporate one or more magnetic disks having surfaces that are logically arranged into arrays of sectors that are typically further arranged into multiple concentric tracks or cylinders. Defect regions will typically incorporate both defective sectors for which data is unrecoverable, as well as pad sectors which themselves are initially not defective, but which provide a buffer region around the defective sectors to inhibit data loss as a result of the growth of a pre-existing defect. Typically, as a result of SAT or later testing, the defective and pad sectors in a defect region are remapped to usable spare sectors located elsewhere on a magnetic disk (e.g., via inline or off-site reassigns), such that attempts to access such sectors will result in access being diverted to the appropriate spare sector.

While the herein-described embodiments focus on a fixed hard disk drive that utilizes disks that incorporate magnetic layers, it will be appreciated that the invention may be utilized in other environments that utilize storage media that may be subject to media defects, e.g., various removable or fixed magnetic or optical media. Therefore, the invention is not limited to the particular environments discussed herein.

As will become more apparent below, the algorithm utilized to expand a buffer region through the reassignment of additional pad sectors proximate a defect region can vary for different situations. For example, it may be desirable to tailor an algorithm to the type of growth observed. Directional padding, which restricts the addition of pad sectors to sectors proximate a detected direction of growth, may be desirable for defects such as media cracks that have been determined to be expanding in a specific direction. Perimeter padding, on the other hand, which attempts to maintain a more uniform buffer around a growing defect, may be desirable to place additional reassigns around an entire defect region, e.g., to address embedded particles or media pits. While either algorithm may be used alone, in some embodiments, it may be desirable to dynamically select from different algorithms based upon the detected characteristics of a media defect.

By implemented dynamic remapping as described herein, a data storage device is able to take pro-active measures to reduce data loss by grown defects. Moreover, typically smaller, and more aggressive buffer regions may be utilized around detected media defects to minimize the amount of space that is removed from the usable space of a storage medium, thus maximizing storage capacity.

In some embodiments consistent with the invention, various parameters and characteristics utilized in connection with dynamic remapping may be configurable by a manufacturer or customer. Some of these parameters may include, for example: (1) an ability to turn defect growth checking during idle time on or off, (2) the number of data recovery steps to allow when reading pad sectors before performing additional padding, (3) the total number of reassigns that can occur before predictive failure analysis (PFA) operations are triggered, (4) the padding algorithm used (e.g., directional or perimeter padding), and (5) an ability to specify the number of times additional padding can be added to a specific defect.

Other variations and modifications will become more apparent from the hereinafter-described embodiments.

Now turning to the Drawings, wherein like numbers denote like parts throughout the several views, FIG. 1 illustrates an exemplary hard disk drive 10 that implements dynamic remapping consistent with the present invention. Drive 10 generally includes one or more magnetic disks 12, an actuator arm 14 including one or more data recording transducers 16 (also referred to as recording or read/write heads), a voice coil motor 18, and a drive controller or control circuit 20.

Control circuit 20 may include, for example, a processor such as a microprocessor or microcontroller 22 to manage the overall operation of the drive. Firmware or microcode program code executed by the processor may be stored in a ROM 24 or other form of non-volatile memory, and/or on a reserved area of disks 12, with working memory for the processor being represented by RAM 26. In addition, control circuit 20 typically includes other electronic circuitry that is controlled under the management of processor 22 to store and retrieve data to and from the magnetic disks 12. The electronic circuitry typically includes a number of functions that are represented by read/write circuit 28, servo circuit 30, interface circuit 32 and formatter circuit 34.

Magnetic disk 12 is typically divided for head positioning purposes into a set of radially spaced tracks, with each track circumferentially divided into a number of data sectors. Sectors may be the same or different sizes from one another. If the disk drive has multiple disks and/or multiple read/write heads, then the set of tracks that are at the same radius on all magnetic disk surfaces is referred to as a "cylinder".

Read/write circuit 28 receives signals from read/write head 16, passes servo information to servo circuit 30, and passes data signals to formatter circuit 34. Servo circuit 30 uses the servo information to produce a drive signal that drives voice coil motor 18 to position read/write head 16. Interface circuit 32 communicates with a host system (not shown) over an interface, passing data and command information. Interface circuit 32 also communicates with formatter circuit 34. Processor 22 also communicates with each circuit 28–34 as required to manage the overall operation of the drive.

In the operation of disk drive 10, interface circuit 32 typically receives a request for reading or writing data sectors from a host system. Formatter circuit 34 receives a list of requested data sectors from interface circuit 32 in the form of logical block addresses, and converts these addresses into cylinder, head and sector numbers that uniquely identify the location of the desired data sectors, in a manner generally understood in the art. The head and cylinder information is passed to servo circuit 30, which is responsible for positioning read/write head 16 over the appropriate data sector on the appropriate cylinder. If the cylinder number provided to servo circuit 30 is not the same as the track number over which read/write head 16 is presently positioned, servo circuit 30 first executes a seek operation in order to reposition the head over the appropriate cylinder.

Once servo circuit 30 has positioned head 16 over the appropriate cylinder, the desired data sectors are located by reading their ID fields. Alternatively, in a disk drive employing a headerless architecture, the servo circuit 30 begins executing sector computations in order to locate and identify the desired data sector, as is generally known in the art. Once located, the appropriate read or write operations are performed, again in a manner that is generally known in the art.

Dynamic remapping consistent with the invention is typically implemented within drive controller 20, and typically using program code executed by processor 22. However, it will be appreciated that the various operations performed in connection with dynamic remapping may be implemented to differing extents in hardware, software or a combination of both. As such, the invention is not limited to the particular program code implementation described herein.

In general, from a software standpoint, any routines executed to implement any of the functionality utilized in the various embodiments of the invention, whether implemented as part of microcode or a higher-level program such as an operating system, application, component, program, object, module or sequence of instructions, or even a subset thereof, will be referred to herein as "computer program code," or simply "program code." Program code typically comprises one or more instructions that are resident at various times in various memory and storage devices in a computer or programmable electronic device, and that, when read and executed by one or more processors in a device, cause that device to perform the steps necessary to execute steps or elements embodying the various aspects of the invention. Moreover, while the invention has and hereinafter will be described in the context of a fully functioning disk drive, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

Furthermore, from a hardware standpoint, for any of the functionality that is or may be implemented in hardware, such functionality may be considered to be implemented in a circuit arrangement incorporating one or more integrated circuit devices as well as additional supporting electronic components. Moreover, as is well known in the art, integrated circuit devices are typically designed and fabricated using one or more computer data files, referred to herein as hardware definition programs, that define the layout of the circuit arrangements on the devices. The programs are typically generated by a design tool and are subsequently used during manufacturing to create the layout masks that define the circuit arrangements applied to a semiconductor wafer. Typically, the programs are provided in a predefined format using a hardware definition language (HDL) such as VHDL, verilog, EDIF, etc. While the invention has and hereinafter may be described in the context of circuit arrangements implemented in fully functioning integrated circuit devices and electronic devices utilizing the same, those skilled in the art will appreciate that circuit arrangements consistent with the invention are also capable of being distributed as program products in a variety of forms, and that the invention applies equally regardless of the particular type of signal bearing media used to actually carry out the distribution.

Figure 2:
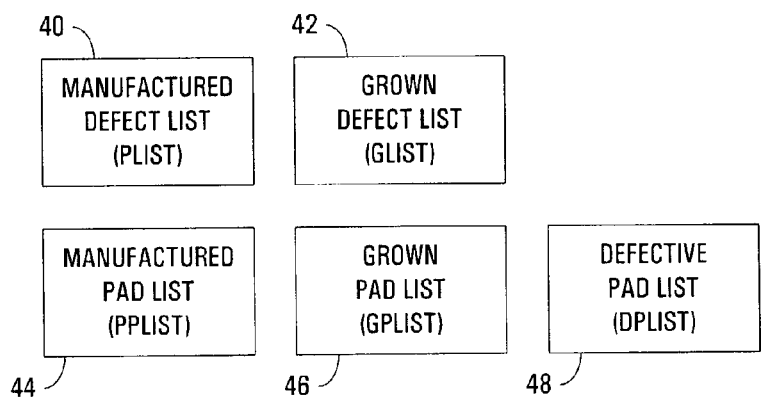
FIG. 2 is a block diagram of several data structures utilized in connection with dynamic remapping in the data storage device of FIG. 1.

Now turning to FIG. 2, in order to implement dynamic remapping consistent with the invention, typically a defect map of some-sort is required to maintain information regarding the existing defects on the magnetic disks, as well as how the sectors associated with these defects are remapped to spare sectors located elsewhere on the magnetic disks.

In general, to implement dynamic mapping consistent with the invention, it is desirable to expand the information maintained in a conventional defect map to permit actual defective sectors to be separately identified from any pad sectors that have been created to form buffers around identified defect regions. Then, as defects grow and pad sectors turn defective, such pad sectors may be updated to be identified as being defective, e.g., by moving such pad sectors from a pad sector list to a defect list.

Conventional data structures utilized for defect mapping of hard disk dives typically consist of two logically distinct lists. A Manufactured Defect List (PLIST) typically includes sites mapped out as defects during manufacturing of a drive, and a Grown Defect List (GLIST) typically includes sites not associated with any PLIST entry that becomes defective during normal operation of a drive. A PLIST and GLIST are represented in the defect map illustrated in FIG. 2 at 40 and 42, respectively.

To implement dynamic mapping in the hereinafter-described embodiment, two additional new lists are utilized, one referred to herein as a Manufactured Pad List (PPLIST) 44, and a Grown Pad List (GPLIST) 46. In this embodiment, the GPLIST and PPLIST not only store location information, but also either explicit or implicit associations back to the particular defect site they are padding, whether it is from the GLIST or the PLIST. It may also be desirable to utilize another accounting table called a Defective Pad List (DPLIST) 48, which specifies pad sectors in either the PPLIST or the GPLIST that have become defective. It will be appreciated that a wide variety of alternate data structures may be utilized in a defect map consistent with the invention. For example, a DPLIST may not be used in some embodiments. Also, defects and pads may not be separately treated based upon whether they are detected during SAT or during operational use. Furthermore, a wide variety of data structures may be utilized in connection with each list.

Figure 3A:
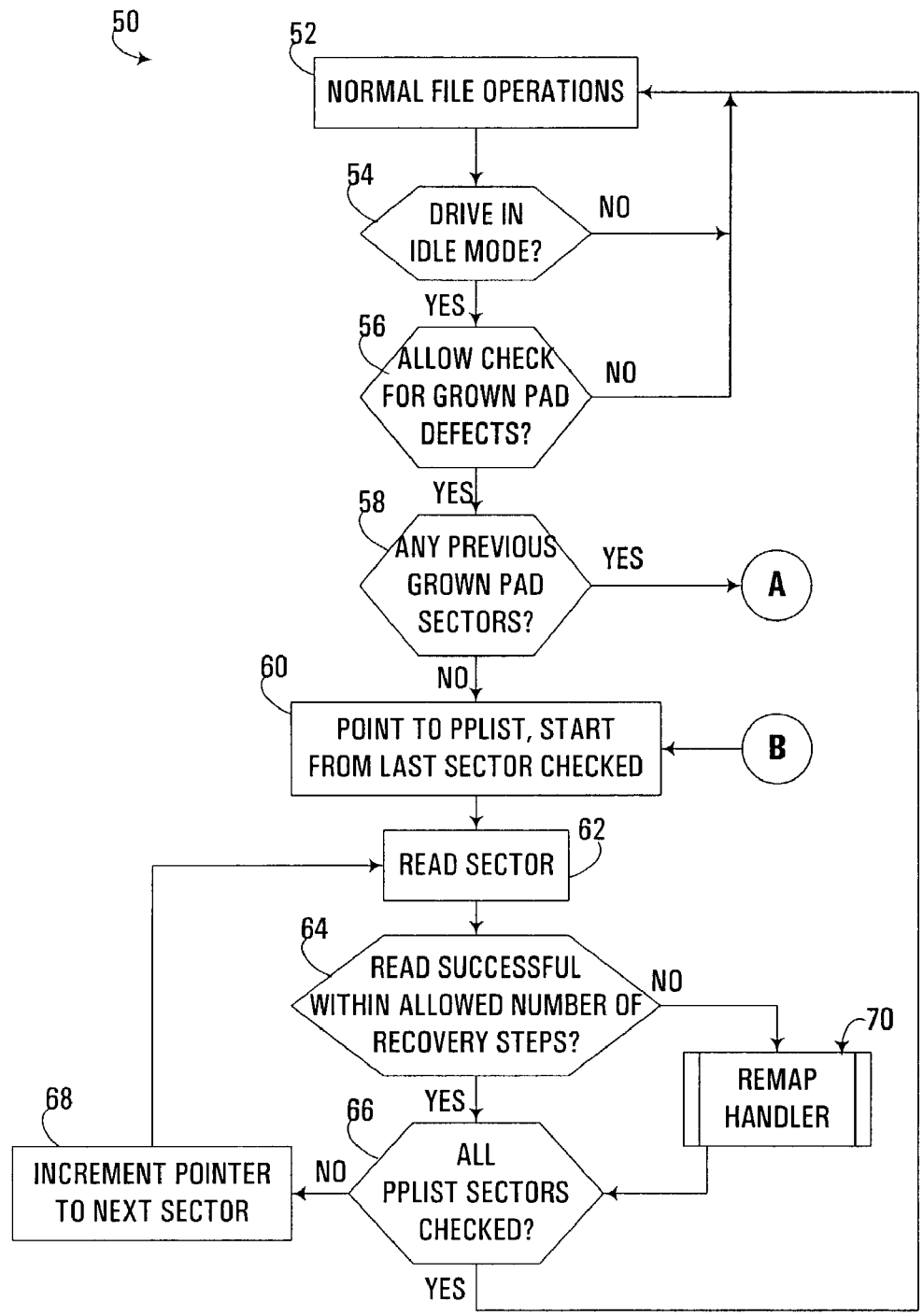
FIGS. 3A and 3B are flowcharts illustrating one implementation of a dynamic remapping routine in the data storage device of FIG. 1.
Figure 3B:
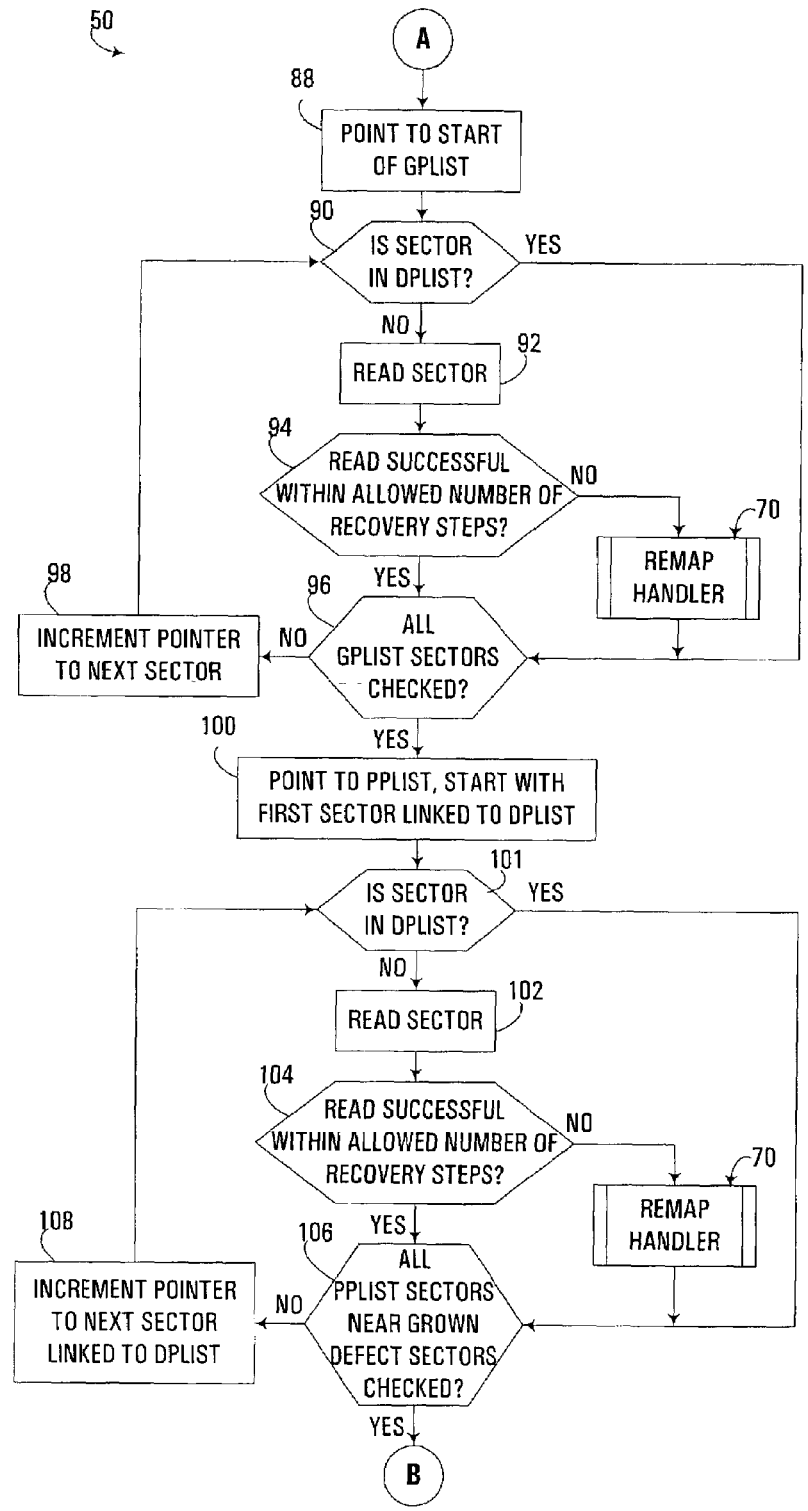
Figure 4:
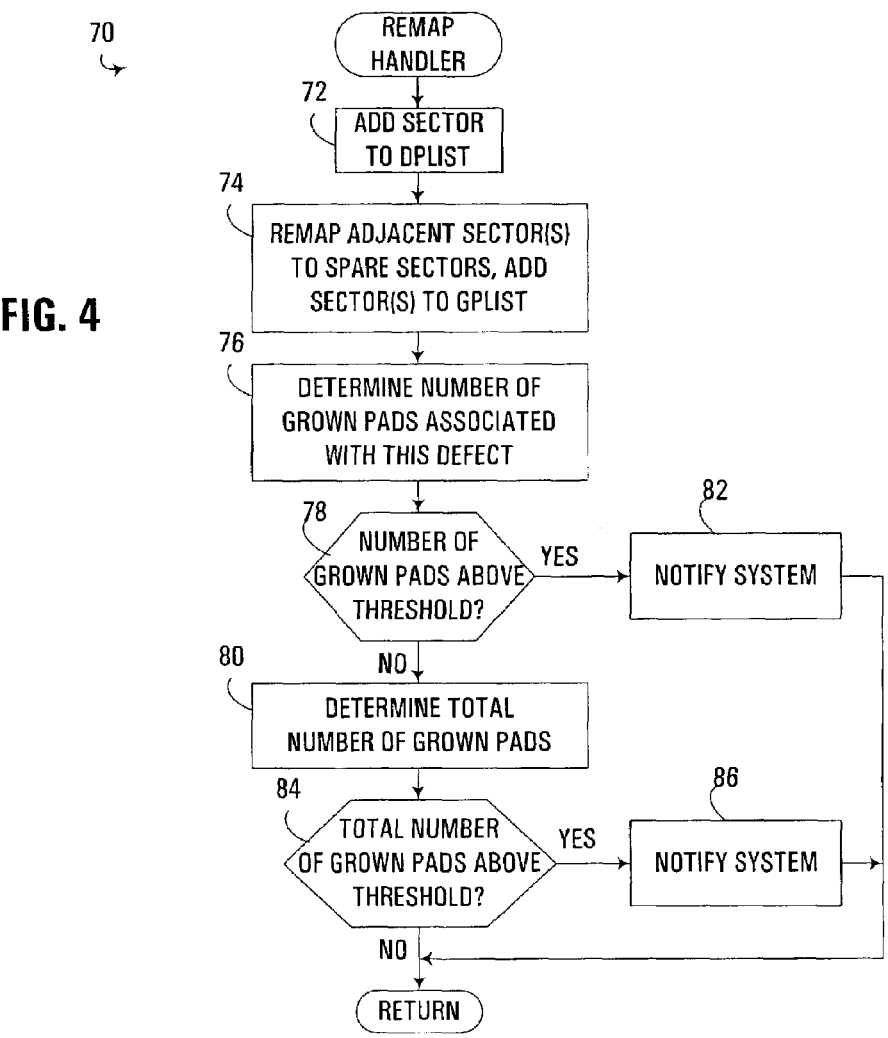
FIG. 4 is a flowchart illustrating the remap handler routine referenced in FIGS. 3A and 3B.

FIGS. 3A, 3B and 4 next illustrate an exemplary dynamic remapping routine 50 consistent with the invention, and capable of being executed by the control circuit 20 of FIG. 1. In addition, to further illustrate the operation of this routine, FIGS. 5A–5D, which illustrate exemplary defects on a disk drive surface, will also be addressed in connection with the disclosure of the exemplary dynamic remapping routine of FIGS. 3A, 3B and 4.

For the purposes of this exemplary routine, it will be assumed that several configuration options may be selected by a user, including: (1) an ability to turn defect growth checking on or off; (2) the number of data recovery steps allowed when reading a PPLIST site; (3) the number of data recovery steps allowed when reading a GPLIST site; (4) the total number of entries allowed in the DPLIST before a PFA trip; (5) the total number of entries allowed in the DPLIST associated with a particular PLIST or GLIST defect site before a PFA trip; and (6) the padding algorithm used around a defect (e.g., directional or perimeter).

Figure 5A:
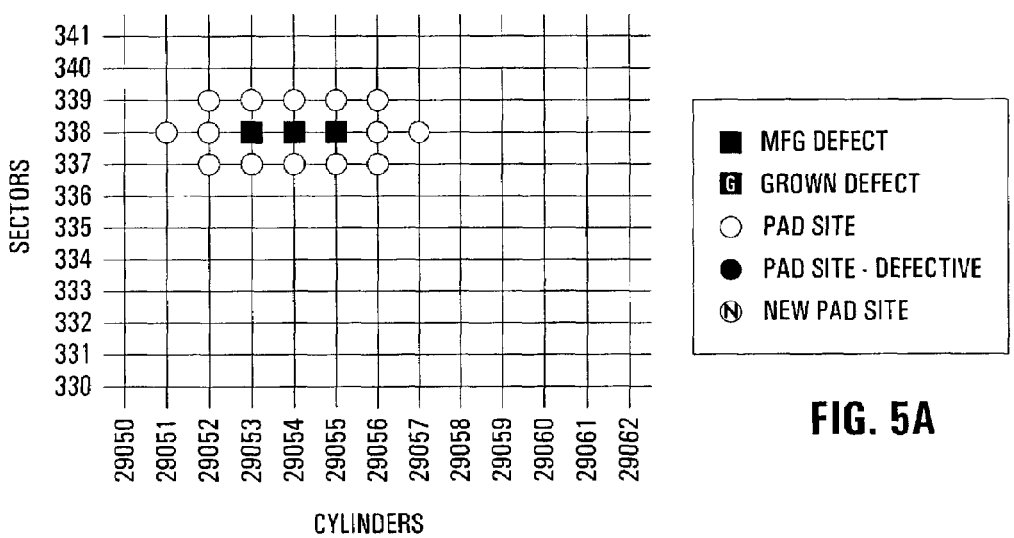
FIGS. 5A–5D are block diagram illustrating exemplary media defects on the surface of a magnetic disk, and of the growth of those defects and the accommodation therefor using the dynamic remapping routine of FIGS. 3A–3B.

Turning briefly to FIG. 5A, assume a simple case where there is one manufacturing defect area consisting of three adjacent sectors. At manufacturing time, the defective sectors are added to a defect map, and a manufacturing algorithm is used to map the defective sectors and any pad sectors disposed adjacent thereto, to non-defective spare sectors. Unlike conventional SAT algorithms, however, the defective sectors and pad sectors are generally stored in separate lists, i.e., the PLIST for defective sectors, and the PPLIST for pad sectors. In this example, sectors are identified by cylinder number/head number/sector number. Hence, it may be seen in FIG. 5A that, subsequent to SAT, three defective sectors, identified at 29053/0/338, 29054/0/338, and 29055/0/338 (assuming a head number of 0), are detected, added to the PLIST, and remapped by the SAT algorithm. Furthermore, pad sectors, e.g., at 29052/0/339 to 29056/0/339, 29052/0/337 to 29056/0/337, 29051/0/338 to 29052/0/338, and 29056/0/338 to 29057/0/338, are also added to the PPLIST and remapped by the SAT algorithm. The state of the defect map for the exemplary drive after SAT is as shown below in Table I:

TABLE I

DEFECT MAP FOLLOWING MANUFACTURING

| PLIST | PPLIST | GLIST | GPLIST | DPLIST |
|---|---|---|---|---|
| 29053/0/338 | 29051/0/338 | | | |
| 29054/0/338 | 29052/0/337 | | | |
| 29055/0/338 | 29052/0/338 | | | |
| | 29052/0/339 | | | |
| | 29053/0/337 | | | |
| | 29053/0/339 | | | |
| | 29054/0/337 | | | |
| | 29054/0/339 | | | |
| | 29055/0/337 | | | |
| | 29055/0/339 | | | |
| | 29056/0/337 | | | |
| | 29056/0/338 | | | |
| | 29056/0/339 | | | |
| | 29057/0/338 | | | |

Now assume a customer has configured the drive using the following settings: (1) defect growth checking function is enabled; (2) one data recovery step is allowed for manufacture pad sectors; (3) no data recovery steps are allowed for grown pad sectors; (4) a maximum of three pad sectors are allowed to become defective, after which a PFA issue is tripped; (5) a particular defect can be padded at most two times, after which a PFA issue is tripped; and (6) the padding algorithm selected is directional padding.

Turning now to FIGS. 3A and 3B, a dynamic remapping routine 50 consistent with the invention is illustrated. First, as shown at block 52, it may be assumed that the drive is typically performing normal file operations in a manner known in the art. Periodically, routine 50 checks to see whether the drive is in an idle mode at block 54, e.g, where there are no pending read or write operations and no other high priority functions taking place. If not, control returns to block 52. Whenever the drive enters an idle mode, however, block 54 may pass control to block 56 to examine the configuration settings to determine if defect growth checking is enabled.

If not, control returns to block 52; otherwise, control passes to block 58 to determine if any previous grown defects exist, i.e., by checking to see if there are any entries in the DPLIST, thus indicating that a pad sector has previously been determined to be defective in connection with dynamic remapping. Initially, no sectors are listed in the DPLIST, so block 58 will pass control to block 60 to initiate a loop to check each pad sector in the PPLIST, ensuring that all known pad sectors are readable within an allowed number of data recovery steps (in this case 1). Specifically, block 60 sets a pointer to point to the PPLIST, and in particular to the last sector checked so that the next time the drive goes idle defect growth checking can continue where it left off until the entire list has been checked (as it is possible that checking of the last sector could have been preempted by a higher priority drive operation that brings the drive out of idle mode, e.g., a read or write operation request). If the drive were to remain idle after completing a pass through the PPLIST, the check starts again from the beginning of the list.

Once the pointer is initialized, the current pad sector is read at block 62. Block 64 then determines whether the read was successful within the allowed number of recovery steps. If so, control passes to block 66 to determine whether all PPLIST pad sectors were checked, and if not, control passes to block 68 to increment the pointer to point to the next pad sector in the PPLIST. Otherwise, control returns to block 52 to commence with normal file operations.

Returning to block 64, if the read of the pad sector was not successful, block 64 calls a remap handler routine 70 to remap the now-defective pad sector, in a manner that will be discussed in greater detail below. Control then passes to block 66 to process additional pad sectors in the PPLIST.

FIG. 4 illustrates remap handler routine 70 in greater detail. Routine 70 begins in block 72 by adding the now-defective sector to the DPLIST. Next, adjacent sectors to the now-defective sector are remapped to spare sectors, and added to the GPLIST (block 74), using the selected padding algorithm (e.g., perimeter or directional). Next, block 76 determines the number of grown pad sectors that are associated with the current defect (i.e., the number of GPLIST sectors linked to a particular defect).

If the number of grown pad sectors is not above the configured threshold, block 78 passes control to block 80 to determine the total number of grown pad sectors (i.e., the total number of sectors in the GPLIST). Otherwise, block 78 passes control to block 82 to notify the system, e.g., using a Predictive Failure Analysis (PFA) issue or notification, and thereafter terminate routine 70.

Returning to block 80, once the total number of grown pad sectors is determined, block 84 then determines whether this total number is above a configured threshold, and if not, terminates routine 70. Otherwise, control passes to block 86 to generate a PFA issue or notification and thereafter terminate the routine.

Figure 5B:
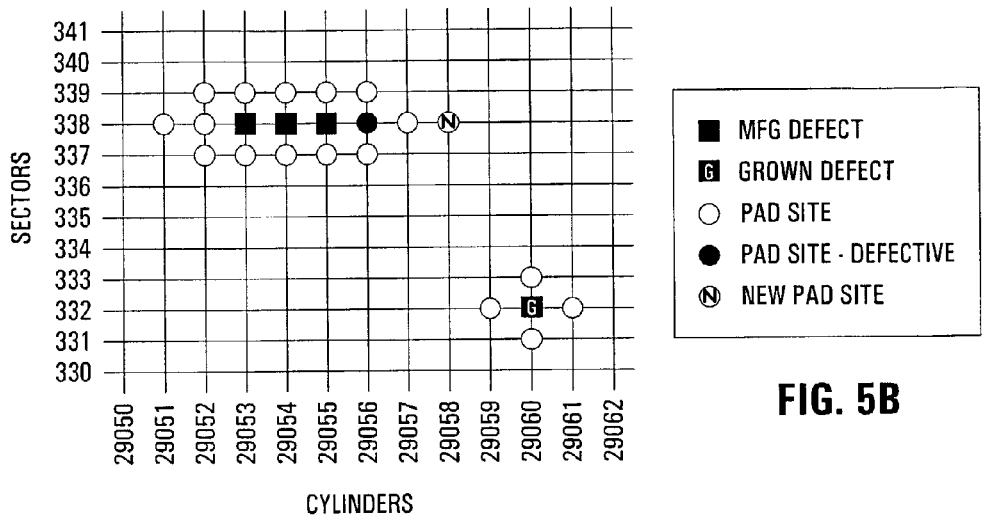

Now turning to FIG. 5B, for the purposes of the example, assume during a pad sector check, it is discovered that one of the pad sectors (29056/0/338) required five recovery steps to read. Since, in this example, the step count is over the configured threshold of 1, the process flow undertakes the actions discussed in connection with routine 70. As a result, the pad sector will be added to the DPLIST, and then based on the selected padding algorithm (e.g., via directional padding, as shown in FIG. 5B), an adjacent usable sector is added as a new pad sector and reassigned to a spare sector in the expected direction of growth of the defect. Furthermore, the new pad sector is added to the GPLIST.

In addition, assume that, during a customer read operation, a soft error site is located, and the error site is reassigned to a spare sector region. This will be considered a grown defect, and so will create a GLIST entry, as well as any associated padding (e.g., via perimeter padding, as shown in FIG. 5B). Pad sectors around GLIST sectors will typically be identified in the GPLIST, since the associated defect did not exist during manufacturing. A grown defect is thus typically treated like a defective pad sector, except there is no original defect associated therewith. Table II illustrates the state of the defect map after the addition of the new pad sectors:

TABLE II

DEFECT MAP FOLLOWING A DEFECTIVE
PAD SECTOR EVENT AND A GROWN DEFECT

| PLIST | PPLIST | GLIST | GPLIST | DPLIST |
|---|---|---|---|---|
| 29053/0/338 | 29051/0/338 | | 29058/0/338 | 29056/0/338 |
| 29054/0/338 | 29052/0/337 | | | |
| 29055/0/338 | 29052/0/338 | | | |
| | 29052/0/339 | | | |
| | 29053/0/337 | | | |

TABLE II-continued

DEFECT MAP FOLLOWING A DEFECTIVE
PAD SECTOR EVENT AND A GROWN DEFECT

| PLIST | PPLIST | GLIST | GPLIST | DPLIST |
|---|---|---|---|---|
| | 29053/0/339 | | | |
| | 29054/0/337 | | | |
| | 29054/0/339 | | | |
| | 29055/0/337 | | | |
| | 29055/0/339 | | | |
| | 29056/0/337 | | | |
| | 29056/0/338 | | | |
| | 29056/0/339 | | | |
| | 29057/0/338 | | | |
| | | 29060/0/332 | 29059/0/332 | |
| | | | 29060/0/331 | |
| | | | 29060/0/333 | |
| | | | 29061/0/332 | |

After adding the new pad sectors, as noted above in connection with routine 70, predictive failure analysis (PFA) triggers may be tested. Each DPLIST entry represents a defect growth step, so the number of entries in the DPLIST may be checked against the configured threshold. Since the total allowed growth for the drive, and the growth of the particular defect does not meet the configured thresholds, no PFA issues are triggered.

Now returning to FIG. 3A, once a GPLIST entry has been created, indicating the existence of a grown defect site, the next time block 58 is encountered, control will pass to block 88 (FIG. 3B). In this regard, it is typically desirable for the GPLIST to take priority over the PPLIST because the GPLIST entries indicate defect sites with a previous history of growing.

Block 88 initiates a two-step process for scanning grown defect areas. First, the GPLIST is traversed using a pointer that does not get reset, so the process can resume after being bumped due to a customer operation or higher priority function. Block 88 initially, however, sets the pointer to point to the start of the GPLIST. Block 90 then performs a check to ensure that GPLIST sectors that have become defective and were added to the DPLIST are not checked.

If a GPLIST sector is not in the DPLIST, control passes to block 92 to perform a read operation on the sector. Block 94 then determines whether the read was successful within an allowed number of recovery steps. Either the same threshold that is used in block 64, or a different threshold, may be used in block 94. In this example, the configuration allows no data recovery steps before failing a read. If a bad read occurs, block 94 calls routine 70 to remap the bad sector. Otherwise, control passes to block 96 to determine whether all GPLIST sectors have been checked.

If not all such sectors have been checked, control passes to block 98 to increment the pointer to the next sector in the GPLIST. Control then returns to block 90. Moreover, returning to block 90, if a sector in the GPLIST is also in the DPLIST, control passes directly to block 96.

Once all sectors in the GPLIST have been checked, control passes to block 100 to loop through the DPLIST entries, checking all PPLIST entries that are associated with the same original defect as each such DPLIST entry (note that, for GLIST defects, there will be no associated PPLIST entries). In particular, block 100 resets the pointer to point to the PPLIST, starting with the first sector in the PPLIST that is linked to by an entry in the DPLIST. Block 101 then performs a check to ensure that the sector is not already in the DPLIST. If the sector is not already in the DPLIST, control passes to block 102 to perform a read on the sector, and block 104 determines whether the read was successful within an allowed number of recovery steps (e.g., using the same threshold as in block 64, since PPLIST entries are being read). If a bad read occurs, remap handler routine 70 is called, and control passes to block 106. Otherwise, block 104 passes control directly to block 106.

Block 106 determines whether all sectors in the PPLIST that are near grown defect sites (i.e., linked to DPLIST entries) have been checked. If not control passes to block 108 to increment the pointer to point to the next PPLIST sector linked to a DPLIST entry, and then back to block 101 to process the next sector. Otherwise, block 106 passes control to block 60 (FIG. 3A) to continue checking the PPLIST. In addition, returning to block 101, if a sector is already in the DPLIST, control passes directly to block 106. Because the checking performed in blocks 88–108 skips through the PPLIST to search all the associated pads for particular defects, it may be desirable to maintain a separate pointer into the PPLIST for the loop defined by blocks 62–68.

Figure 5C:
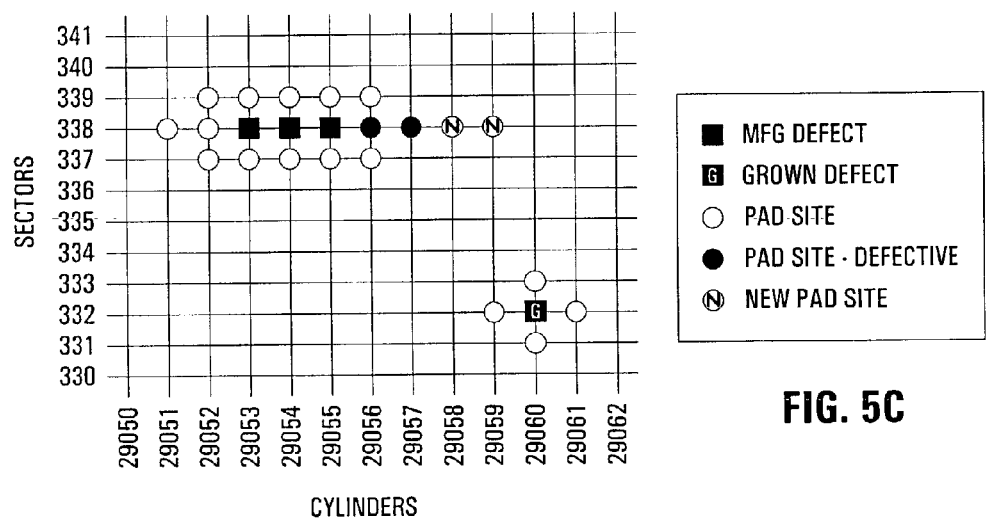

Continuing with the aforementioned example, assume read/write operations are initiated subsequent to the events illustrated in FIG. 5B. Assume also that, eventually, during a later idle cycle, another pad sector (e.g., 29057/0/338) is detected as being defective. As a result, a new entry is added to the DPLIST, and a reassign of another pad sector (e.g., 29059/0/338) is performed, thus adding another pad sector to the GPLIST. The reassignment of these sectors is illustrated in FIG. 5C. Moreover, the resulting defect map is as shown in Table III below:

TABLE III

ADDITIONAL PAD GOES DEFECTIVE

| PLIST | PPLIST | GLIST | GPLIST | DPLIST |
|---|---|---|---|---|
| 29053/0/338 | 29051/0/338 | | 29058/0/338 | 29056/0/338 |
| 29054/0/338 | 29052/0/337 | | 29059/0/338 | 29057/0/338 |
| 29055/0/338 | 29052/0/338 | | | |
| | 29052/0/339 | | | |
| | 29053/0/337 | | | |
| | 29053/0/339 | | | |
| | 29054/0/337 | | | |
| | 29054/0/339 | | | |
| | 29055/0/337 | | | |
| | 29055/0/339 | | | |
| | 29056/0/337 | | | |
| | 29056/0/338 | | | |
| | 29056/0/339 | | | |
| | 20957/0/338 | | | |
| | | 29060/0/332 | 29059/0/332 | |
| | | | 29060/0/331 | |
| | | | 29060/0/333 | |
| | | | 29061/0/332 | |

It should also be noted that, during execution of routine 70 in connection with reassigning additional pad sectors, PFA thresholds will also be checked. Using the aforementioned example setup, it is found that the same defect has had two growth events, which is the trip threshold, and a PFA notification or issue may be raised for later reporting to a system or customer. As a result, a customer might be inclined to discontinue operations on the drive, and copy all data off the drive and onto a new one. Otherwise, however, a customer might ignore an initial PFA warning and continue to run.

Figure 5D:
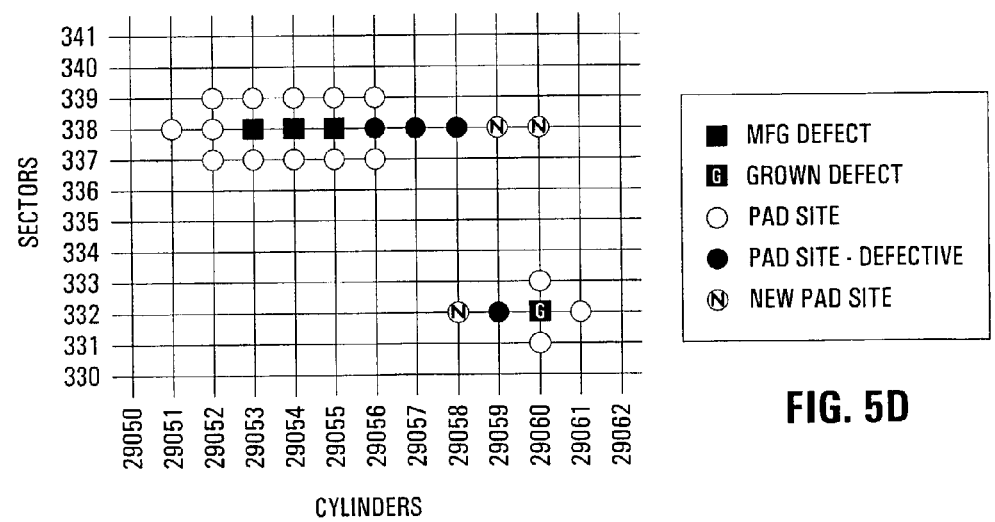

Under this latter scenario, assume that the drive goes idle again after some number of operations, and while traversing the GPLIST in the loop of blocks 90–98 (FIG. 3B), another pad sector goes defective (e.g., pad 29058/0/338), a sector that also happens to be a pad sector that was identified in the GPLIST. The aforementioned operations of adding new pad sectors still occur, but even though the total number of defects is now above the configured threshold of three, a comparatively more important PFA event that a single defect has grown more than twice will be reported. Moreover if yet another pad sector, e.g., around the GLIST entry (e.g., pad 29059/0/332), goes defective, then it will trigger the PFA for the total number of growth steps being too large. In the example, the configured threshold is set to three, and four defects have been added to the DPLIST. The presence of these additional failures and remapping are shown in FIG. 5D.

The GPLIST entries that went defective in both of the cases above are placed into the DPLIST, but also remain in the GPLIST, as the DPLIST is principally an accounting mechanism. This is why it may be desirable to test each GPLIST entry before attempting to check that entry to make sure the entry is not for a known defective pad.

With regard to the defect map, it may be desirable to segregate each of the PLIST, PPLIST, GLIST, and GPLIST lists into buckets in some instances to associate all pad sectors with the defect sectors they are padding. This can be accomplished in a variety of ways, but for the sake of this example, one method would be to assign each defect or set of related defects a defect number that is stored in the list, along with its location. In this way the PPLIST and GPLIST entries could then reference the defect bucket number they are padding. This would enable the checking of related pad sectors as described in connection with the loop at blocks 104–108 of FIG. 3B.

Since the simple examples provided herein did not have multiple manufacturing defects in the defect map, the bucket numbers have been omitted for clarity. The three PLIST entries would typically be associated with one defect bucket, and the GLIST defect sector would be a separate defect bucket. For illustration purposes, in Table IV, all pad sectors associated with the GLIST entry are highlighted with a * symbol. The divided table was done merely for clarity of association:

TABLE IV

ADDITIONAL PADS FROM GPLIST GO DEFECTIVE

| PLIST | PPLIST | GLIST | GPLIST | DPLIST |
|---|---|---|---|---|
| 29053/0/338 | 29051/0/338 | | 29058/0/338 | 29056/0/338 |
| 29054/0/338 | 29052/0/337 | | 29059/0/338 | 29057/0/338 |
| 29055/0/338 | 29052/0/338 | | | 29058/0/338 |
| | 29052/0/339 | | | |
| | 29053/0/337 | | | |
| | 29053/0/339 | | | |
| | 29054/0/337 | | | |
| | 29054/0/339 | | | |
| | 29055/0/337 | | | |
| | 29055/0/339 | | | |
| | 29056/0/337 | | | |
| | 29056/0/338 | | | |
| | 29056/0/339 | | | |
| | 29057/0/338 | | | |
| | | *29060/0/332 | *29059/0/332 | *29059/0/332 |
| | | | *29060/0/331 | |
| | | | *29060/0/333 | |
| | | | *29061/0/332 | |
| | | | *29058/0/332 | |

As noted above, various alternative data structures may be used to represent the various sectors in a defect map. Moreover, different manners of checking for defective pad sectors may be used in the alternative. As such, the invention is not limited to the particular dynamic remapping routine illustrated in FIGS. 3A, 3B and 4.

Other modifications will be apparent to one of ordinary skill in the art. Therefore, the invention lies in the claims hereinafter appended.

What is claimed is:

1. A method of operating a hard disk drive of the type including a defect map that identifies at least one defect on a magnetic disk in the hard disk drive, and that remaps at least one defective sector associated with the defect, and at least one non-defective pad sector disposed adjacent thereto, to spare sectors disposed elsewhere on the magnetic disk, the method comprising, subsequent to initiation of operational use of the hard disk drive:
   (a) accessing the defect map to identify the pad sector;
   (b) scanning the pad sector and detecting that the pad sector is defective, wherein the detection that the pad sector is defective is indicative of growth of the defect on the magnetic disk over time; and
   (c) in response to detecting that the pad sector is defective, updating the defect map to identify the pad sector as being defective, and remapping an additional sector disposed adjacent to the defective pad sector to an additional spare sector on the magnetic disk to create an additional pad sector in the defect map.

2. A method of mapping defects on a data storage medium, the method comprising:
   (a) detecting growth of a previously-identified defect on a data storage medium, wherein the previously-identified defect is associated with a defect region that has been mapped to a first replacement region; and
   (b) remapping at least one region adjacent to the defect region to a second replacement region to accommodate for the growth of the previously-identified defect.

3. The method of claim 2, wherein the defect region includes at least one defective sector and at least one pad sector disposed adjacent to the defective sector, and wherein detecting growth of the previously-identified defect includes scanning the pad sector for a defect.

4. The method of claim 3, wherein remapping the at least one region adjacent to the defect region includes reassigning at least one sector adjacent to the pad sector in response to detecting a defect in the pad sector.

5. The method of claim 3, wherein the defective sector is identified in a defect sector list and the pad sector is identified in a pad sector list, the method further comprising indicating in the defect map that the pad sector is defective in response to detecting growth of the previously-identified defect.

6. The method of claim 5, wherein remapping the at least one region adjacent to the defect region includes adding at least one sector adjacent to the pad sector to the defect map.

7. The method of claim 6, wherein adding the at least one sector adjacent to the pad sector to the defect map includes storing the at least one sector in a grown pad sector list, and wherein indicating that the pad sector is defective includes indicating the pad sector is defective in a defective pad list.

8. The method of claim 3, wherein remapping the at least one region adjacent to the defect region includes reassigning at least one sector disposed generally along a direction of growth relative to the pad sector.

9. The method of claim 3, wherein remapping the at least one region adjacent to the defect region includes reassigning a plurality of sectors disposed around a perimeter of the defect region.

10. The method of claim 3, wherein the first and second replacement regions each comprise at least one spare sector.

11. The method of claim 2, wherein the defect region is assigned during manufacturing of a data storage device incorporating the data storage medium, and wherein detecting growth of the previously-identified defect and remapping the at least one region are performed subsequent to operational use of the data storage device.

12. The method of claim 2, wherein detecting growth of the previously-identified defect and remapping the at least one region are performed during an idle time subsequent to operational use of a data storage device incorporating the data storage medium.

13. The method of claim 2, further comprising initiating a predictive failure analysis operation in response to detecting growth of the previously-identified defect beyond a predetermined threshold.

14. The method of claim 13, wherein the predetermined threshold is associated with at least one of a number of detected defective pad sectors and a number of times at least one pad sector is added for the defect region.

15. The method of claim 2, wherein the data storage medium comprises a magnetic disk in a hard disk drive.

16. An apparatus, comprising:
   (a) a data storage medium; and
   (b) a control circuit coupled to the data storage medium and configured to detect growth of a previously-identified defect on the data storage medium, wherein the previously-identified defect is associated with a defect region that has been mapped to a first replacement region, the control circuit further configured to remap at least one region adjacent to the defect region to a second replacement region to accommodate for the growth of the previously-identified defect.

17. The apparatus of claim 16, wherein the defect region includes at least one defective sector and at least one pad sector disposed adjacent to the defective sector, and wherein the control circuit is configured to detect growth of the previously-identified defect by scanning the pad sector for a defect.

18. The apparatus of claim 17, wherein the control circuit is configured to remap the at least one region adjacent to the defect region by reassigning at least one sector adjacent to the pad sector in response to detecting a defect in the pad sector.

19. The apparatus of claim 17, wherein the defective sector is identified in a defect sector list and the pad sector is identified in a pad sector list, and wherein the control circuit is further configured to indicate in the defect map that the pad sector is defective in response to detecting growth of the previously-identified defect.

20. The apparatus of claim 19, wherein the control circuit is configured to remap the at least one region adjacent to the defect region by adding at least one sector adjacent to the pad sector to the defect map.

21. The apparatus of claim 17, wherein the control circuit is configured to remap the at least one region adjacent to the defect region by reassigning at least one sector disposed generally along a direction of growth relative to the pad sector.

22. The apparatus of claim 17, wherein the control circuit is configured to remap the at least one region adjacent to the defect region by reassigning a plurality of sectors disposed around a perimeter of the defect region.

23. The apparatus of claim 17, wherein the first and second replacement regions each comprise at least one spare sector.

24. The apparatus of claim 16, wherein the defect region is assigned during manufacturing of a data storage device incorporating the data storage medium, and wherein the control circuit is configured to detect growth of the previously-identified defect and remap the at least one region subsequent to operational use of the data storage device.

25. The apparatus of claim 16, wherein the control circuit is configured to detect growth of the previously-identified defect and remap the at least one region during an idle time subsequent to operational use of a data storage device incorporating the data storage medium.

26. The apparatus of claim 16, wherein the control circuit is further configured to initiate a predictive failure analysis operation in response to detecting growth of the previously-identified defect beyond a predetermined threshold.

27. The apparatus of claim 16, wherein the data storage medium comprises a magnetic disk in a hard disk drive.

28. A program product, comprising:
(a) program code including computer readable instructions configured to detect growth of a previously-identified defect on a data storage medium in a data storage device, wherein the previously-identified defect is associated with a defect region that has been mapped to a first replacement region, the program code further configured to remap at least one region adjacent to the defect region to a second replacement region to accommodate for the growth of the previously-identified defect; and
(b) a computer readable medium bearing the program code.

29. The program product of claim 28, wherein the computer readable medium includes a recordable medium.

* * * * *